(12) United States Patent
Togashi

(10) Patent No.: US 6,914,865 B2
(45) Date of Patent: Jul. 5, 2005

(54) DEVICE FOR CORRECTING TILT ABERRATION IN AN OPTICAL PICKUP AND METHOD THEREFOR

(75) Inventor: Mitsuhiro Togashi, Yokohama (JP)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 299 days.

(21) Appl. No.: 09/821,742

(22) Filed: Mar. 30, 2001

(65) Prior Publication Data

US 2002/0001273 A1 Jan. 3, 2002

(30) Foreign Application Priority Data

Apr. 14, 2000 (JP) ........................................ 2000-113130

(51) Int. Cl.[7] .............................................. G11B 7/095
(52) U.S. Cl. ................................ 369/53.19; 369/44.32; 369/112.02
(58) Field of Search ........................... 369/53.19, 44.32, 369/112.02

(56) References Cited

U.S. PATENT DOCUMENTS 5,140,454 A * 8/1992 Shibaguchi ................. 359/254
5,436,460 A * 7/1995 Stengl et al. ............ 250/492.21
6,141,304 A * 10/2000 Ogasawara ............... 369/53.19
6,151,154 A * 11/2000 Ogasawara et al. ......... 359/279
6,411,576 B1 * 6/2002 Furukawa et al. ........ 369/53.19
6,430,130 B1 * 8/2002 Furukawa ................ 369/53.19
6,532,202 B1 * 3/2003 Wada et al. ........... 369/112.02
6,643,244 B1 * 11/2003 Iwasaki .................. 369/112.01

* cited by examiner

Primary Examiner—Gautam R. Patel
(74) Attorney, Agent, or Firm—Morgan, Lewis & Bockius LLP

(57) ABSTRACT

An optical pickup includes a light emitting unit, an object lens, and a correction unit. The object lens focuses a beam of light onto a recording surface of an optical disc. The correction unit has a light transmitting surface. A plurality of electrodes are arranged on a plurality of divided areas of the light transmitting surface. The correction unit corrects an aberration caused by a tilt of an optical axis of the beam of light relative to the recording surface of the recording disc by applying voltages to the electrodes. The applied voltages correspond to the tilt of the optical axis of the beam of light. The correction unit also changes phases of the beam of light passing through the divided areas of the light transmitting surface.

2 Claims, 6 Drawing Sheets

DEVICE FOR CORRECTING TILT ABERRATION IN AN OPTICAL PICKUP AND METHOD THEREFOR

BACKGROUND OF THE INVENTION

1. Field of the Invention

The present invention relates, in general, to optical disc drivers and, more particularly, to an optical pickup having a correction unit for correcting an aberration resulting from a tilt of an optical axis of a beam of light, which is emitted by the optical pickup and focused onto the recording surface of an optical disc, relative to the recording surface.

2. Description of the Prior Art

It is commonly required that an optical pickup should be improved in precision to meet requirements for a densification of an optical disc. In particular, it is currently required that an optical axis of a beam of light, which is emitted by the optical pickup and focused onto the recording surface of an optical disc, that is, an optical axis of an object lens installed in the optical pickup should be perfectly perpendicular to the recording surface.

On the other hand, with the densification of the optical disc, the number of apertures (NA) of the object lens installed in the optical pickup increases and the beam of light emitted from the optical pickup has a shorter wavelength. As a result, a coma-aberration increases significantly due to a tilt, which leads to a keen need for correction of the coma-aberration.

In the prior art, a liquid crystal panel has been used as a correction unit for correcting such a coma-aberration. A conventional liquid crystal panel has an electrode layer on each surface of its liquid crystal substrate to change the orientation of liquid crystal molecules in response to voltages applied to the electrode layers. The liquid crystal panel thus changes the refractive index of a bean of light passing through its liquid crystal substrate, and corrects a wavefront aberration, caused by a tilt of an optical axis of a light beam emitted by an optical pickup. That is, the voltages, applied to the divided areas of the liquid crystal substrate, are changed to cause a change in the refractive index of the light beam. It is thus possible to make the lengths of the optical paths at the divided areas different from each other, and change the optical axis extending to the recording surface of an optical disc, and thereby correct an aberration due to a tilt of the optical axis of the light beam.

However, the liquid crystal panel used as an aberration correcting unit in the prior art is Problematic as follows. That is, during an operation of a conventional optical pickup using a liquid crystal panel, the object lens used for focusing the light beam to the recording surface of an optical disc is shifted in a radial direction of the disc due to a tracking servo of the optical pickup for radially moving on the recording surface to read data of the tracks of the disc. The optical axis of the object lens may be thus misaligned from the central axis of the liquid crystal panel in the radial direction of the optical disc, and deteriorates the aberration correcting performance of the optical pickup. When both the object lens and the liquid crystal panel are shifted, it is possible to prevent such a deterioration of the aberration correcting performance. However, such a shift of both the object lens and the liquid crystal panel undesirably causes the shifted parts of the lens and the panel to be overlapped. In addition, it is very difficult to precisely arrange the electrodes on the liquid crystal panel in the case of the shift of both the object lens and the liquid crystal panel, and so such a shift has been less likely to be used in the prior art.

In an effort to overcome such deterioration in the aberration correcting performance of an optical pickup, a checkered electrode pattern may be formed on a liquid crystal panel, with the voltage applying points being changed in response to a radial shift of the object lens. However, this technique is problematic in that the liquid crystal panel is excessively expensive, in addition to causing an operational problem while controlling the liquid crystal panel.

SUMMARY OF THE INVENTION

Accordingly, the present invention has been made keeping in mind the above problems occurring in the prior art, and an object of the present invention is to provide an optical pickup, of which the aberration correcting unit is not expensive, but is easily controllable, in addition to effectively correcting an aberration caused by a radial shift of the object lens of the optical pickup.

In order to accomplish the above object, the present invention provides an optical pickup, comprising: a light emitting unit used for emitting light, an object lens used for collimating the light from the light emitting unit to form a beam of light and focusing the beam of light to the recording surface of an optical disc, and a correction unit used for correcting an aberration caused by a tilt of the optical axis of the beam of light relative to the recording surface of the optical disc, wherein the correction unit has a light transmitting surface capable of allowing a transmission of the light from the light emitting unit, with a plurality of electrodes arranged on a plurality of divided areas of the light transmitting surface, the correction unit correcting the aberration by applying voltages, corresponding to the lilt of the optical axis of the beam of light relative to the recording surface of the optical disc, to the electrodes and changing phases of the beam of light passing through the divided areas of the light transmitting surface, and the electrodes consisting of: a first electrode arranged on at least one area of the light transmitting surface of the correction unit at a position maximizing an aberration, caused by a radial tilt of the optical axis of the beam of light relative to the recording surface of the optical disc in a radial direction of the disc; and a second electrode arranged on at least one area of the light transmitting surface of the correction unit at a position minimizing the aberration, caused by the radial tilt of the optical axis of the beam of light relative to the recording surface of the optical disc.

In the optical pickup, the summed length of the first and second electrodes in the radial direction of the optical disc ranges from 50% to 70% of the diameter of the object lens, and the length of the first or second electrode in a Tangential direction of the optical disc ranges from 40% to 50% of the diameter of the object lens.

In addition, the electrodes, arranged on the divided areas of the light transmitting surface of the correction unit, further comprise: a third electrode arranged on at least one area of the light transmitting surface of the correction unit at a position maximizing an aberration, caused by a tangential tilt of the optical axis of the beam of light relative to the recording surface of the optical disc in a tangential direction of the disc; a fourth electrode arranged on at least one area of the light transmitting surface of the correction unit at a position minimizing the aberration, caused by the tangential tilt of the optical axis of the bean of light relative to the recording surface of the optical disc; a fifth electrode arranged to be aligned with the third and fourth electrodes at a position close to the edge of the light transmitting surface outside the third electrode; and a sixth electrode arranged to be aligned with the third and fourth electrodes at a position close to the edge of the light transmitting surface outside the fourth electrode.

BRIEF DESCRIPTION OF THE DRAWINGS

The above and other objects, features and other advantages of the present invention will be more clearly understood from the following detailed description taken in conjunction with the accompanying drawings, in which:

FIG. 4b is a graph, showing coma-aberrations at the cross-section taken along the line A–A' of the chart of FIG. 4a;

DETAILED DESCRIPTION OF THE INVENTION

Figure 1:
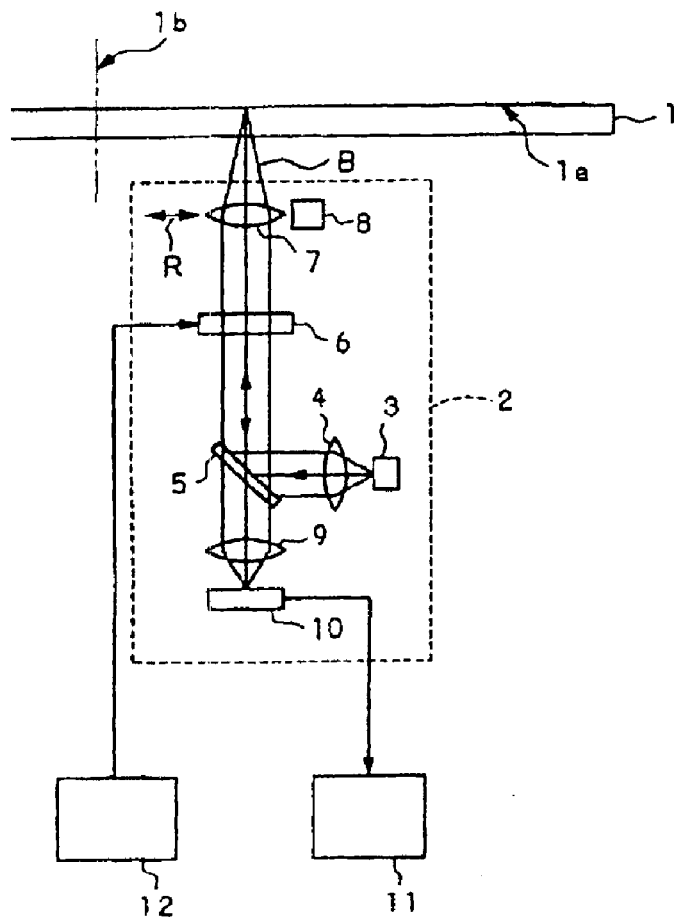
FIG. 1 is a view, showing the construction of an optical pickup usable in an optical disc driver in accordance with the preferred embodiment of the present invention.

Reference now should be made to the drawings, in which the same reference numerals are used throughout the different drawings to designate the same or similar components.

FIG. 1 is a view, showing the construction of an optical pickup usable in an optical disc driver in accordance with the preferred embodiments of the present invention. In the drawing, the reference numeral 1 denotes an optical disc seated in an optical disc driver, with a plurality of data recording tracks concentrically formed on the recording surface 1a of the disc 1. The optical disc 1 is rotatable around its rotating axis 1b.

The reference numeral 2 denotes an optical pickup used for reading the data recorded on the tracks of the recording surface 1a of the disc 1. The optical pickup 2 comprises a light emitting unit 3, a collimating lens 4, a beam splitter 5, a liquid crystal panel 6, an object lens 7, an object lens shifter 8, a light receiving lens 9, and a light receiving unit 10. In the present invention, a laser diode may be used as the light emitting unit 3, which emits a light beam to the optical disc 1. The collimating lens 4 collimates the light beam from the light emitting unit 3, thus making a collimated light beam. The beam splitter 5 reflects the collimated light beam from the collimating lens 4 at a reflection angle of 90°, and so the optical path of the collimated light beam is refracted at the angle of 90°. The liquid crystal panel 6 corrects the wavefront aberration of the light beam while allowing the light beam to pass through it. The object lens 7 focuses the light beam "B" from the liquid crystal panel 6 to the recording surface 1a of the optical disc 1.

The incident light beam "B" is reflected by the recording surface 1a of the optical disc 1, and passes through both the object lens 7 and the liquid crystal panel 6 prior to reaching the beam splitter 5. The reflected light beam passes through the beam splitter 5 to reach the light receiving lens 9. The light receiving lens 9 focuses the reflected light beam "B" on the light receiving surface of the light receiving unit 10. In the present invention, a photodiode may be usable as the light receiving unit 10, and receives the reflected light beam at its light receiving surface. Upon receiving the reflected light beam, the light receiving unit 10 outputs a light quantity signal indicating the quantity of reflected light beam received by its light receiving surface.

The light quantity signal from the light receiving unit 10 is applied to a regenerative circuit 11, which demodulates the light quantity signal to regenerate the data recorded on the desired tracks of the optical disc 1. The liquid crystal panel 6 of the optical pickup 2 is controlled by an LC panel control circuit 12. During an operation of the optical disc driver, the object lens 7 is shifted in a radial direction "R" of the optical disc 1 by the object lens shifter 8. Therefore, it is possible to allow the object lens 7 to precisely focus the light beam "B" to a desired track even when the desired track formed on the recording surface 1a of the disc 1 is shifted in the radial direction "R" of the optical disc 1.

Figure 2:
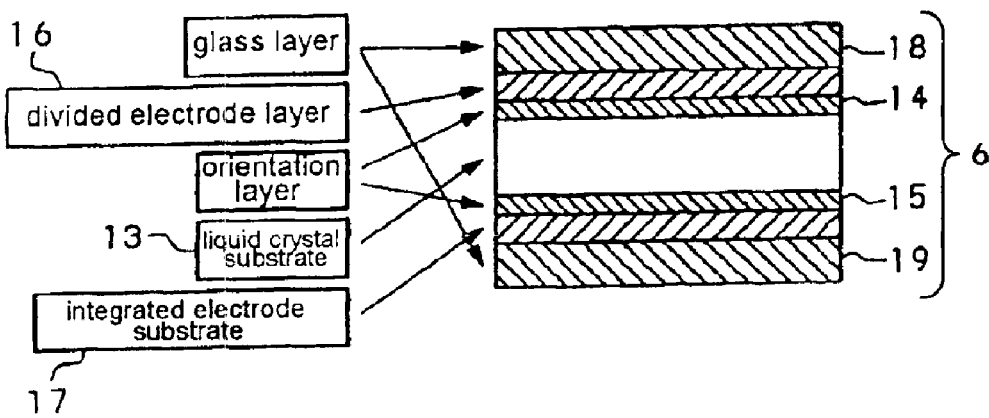
FIG. 2 is a sectional view, showing the laminated structure of a liquid crystal panel included in the optical pickup of this invention.

FIG. 2 is a sectional view, showing the laminated structure of the liquid crystal panel 6 included in the optical pickup 2 of this invention. As shown in the drawing, the liquid crystal panel 6 comprises two orientation layers 14 and 15, which are formed on opposite surfaces of a liquid crystal substrate 13 to cause a desired molecular orientation of liquid crystal of the substrate 13, with two transparent electrode layers formed on the outer surfaces of the two orientation layers 14 and 15. The transparent electrode layer, formed on the outer surface of the first orientation layer 14, is a divided electrode layer 16, which has a plurality of divided electrodes as will be described in detail later herein. On the other hand, the transparent electrode layer, formed on the outer surface of the second orientation layer 15, is an integrated electrode layer 17, which has an integrated electrode. The LC panel control circuit 12 applies AC voltages to the two electrode layers 16 and 17, with the amplitudes of the AC voltages being controlled. Two glass protection layers 18 and 19 are laminated on the outer surfaces of the two electrode layers 16 and 17 so as to protect the liquid crystal panel 6 from external impact.

Figure 3A:
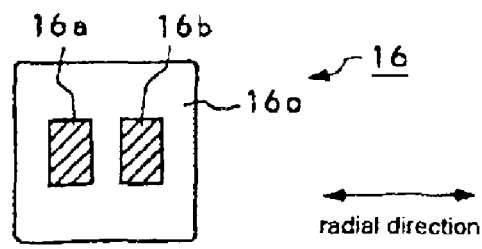
FIGS. 3a and 3b are views, showing divided electrode patterns of electrode layers of liquid crystal panels according to the primary embodiment of the present invention and a comparative embodiment, respectively.

The construction and operation of an optical pickup in accordance with the primary embodiment of this invention will be described herein below. The divided electrode pattern of the electrode layer 16 of the liquid crystal panel 6 according to the primary embodiment of this invention is shown in FIG. 3a. In the primary embodiment, the liquid crystal panel 6 corrects an aberration caused by a radial directional tilt. On the other hand, FIG. 3b shows a divided electrode pattern of an electrode layer of a liquid crystal panel according to a comparative embodiment.

In the primary embodiment of FIG. 3a, the divided electrode layer 16 has two independent electrodes 16a and 16b, and one common electrode 16c. The two independent electrodes 16a and 16b are arranged on the electrode layer 16 in a radial direction of the optical disc 1 while being parallel to each other. The central positions of the two independent electrodes 16a and 16b are placed at positions, at which the coma-aberration caused by the radial directional tilt is maximized and minimized.

Figure 3B:
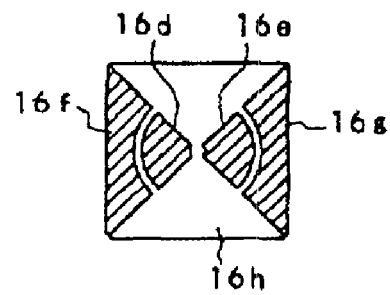

However, in the comparative embodiment of FIG. 3b, two inner independent electrodes 16d and 16e are placed at positions, at which the coma-aberration is maximized and minimized. In addition, two outer independent electrodes 16f and 16g are arranged at positions close to opposite edges of the liquid crystal panel outside the two inner independent electrodes 16d and 16e. The four independent electrodes 16d, 16e, 16f and 16g are arranged on the electrode layer along the radial direction of the optical disc, with the remaining area of the electrode layer being formed by a common electrode 16h.

AC voltages, having amplitudes corresponding to tilts, are applied from the LC panel control circuit 12 to the two independent electrodes 16a and 16b of the divided electrode layer 16 according to the primary embodiment of this invention. Another AC voltage having a reference amplitude is applied to the common electrode 16c of said divided electrode layer 16. In such a case, the sign of inequality of the amplitudes between the first independent electrode 16a and the common electrode 16c is completely opposite to that between the second independent electrode 16b and the common electrode 16c. When the reference amplitude of the common electrode 16c is set to zero as an example, the amplitudes of the two independent electrodes 16a and 16b are completely opposite in their signs That is, the amplitudes of the two independent electrodes have a minus sign and a plus sign, respectively.

In the present invention, the electrode layer 16 is defined such that its electrode is divided into a pattern corresponding to a distribution of wavefront aberration. The wavefront aberration means an occurrence of an optical phase divergence in the optical pickup. Such an optical phase divergence results in deterioration in the operational performance of the optical pickup when the pickup reads the data recorded on the tracks of the optical disc 1 during an operation of an optical disc driver. Such deterioration in the operational performance of the optical pickup may be prevented by advancing a retarded optical phase, in addition to retarding an advanced optical phase using the liquid crystal panel 6 acting as the aberration correcting unit. The coma-aberration is caused by a tilt, and has a distribution explained by the following Expressions I and II. In the following Expressions I and II, "r" and "φ" denote a radius and an angle of polar coordinates as seen by the eye, respectively, and "$Z_6$" and "$Z_7$" denote comparative coefficients of aberrations.

$$W(r,\theta)=Z_7(3r^3-2)r \sin \phi \text{ or } W(r,\theta)=Z_6(3r^3-2)r \cos \phi \quad \text{[Expression I]}$$

$$Z_6 \text{ or } Z_7 = -\frac{t}{6}\frac{(n^2-1)n^2\sin\theta\cos\theta}{(n^2-\sin^2\theta)^{\frac{5}{2}}}NA^3 \quad \text{[Expression II]}$$

In the Expressions I and II, "n" is the refractive index of a substrate, "θ" is the inclination angle of the substrate, "t" is the thickness of the substrate, and "NA" is the number of apertures of the object lens installed in the optical pickup.

Therefore, it is possible to correct the coma-aberration by dividing the electrode layer 16 into an electrode pattern corresponding to the distribution of the coma-aberration and applying voltages corresponding to tilts to the divided electrode pattern.

Figure 4A:
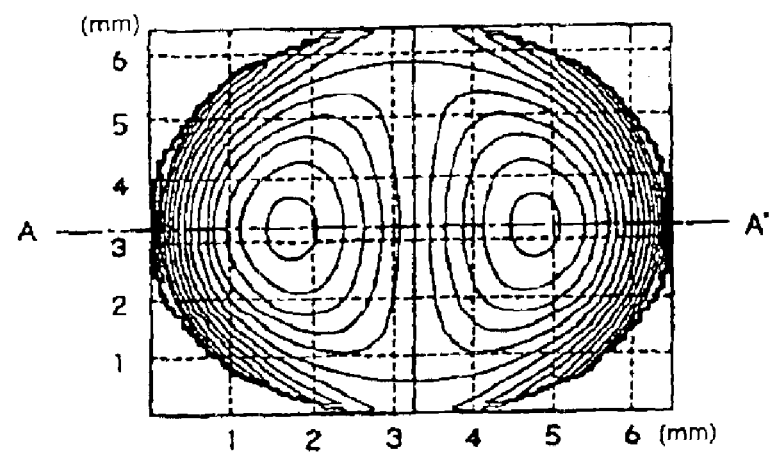
FIG. 4a is a chart, showing the distribution of coma-aberrations caused in an optical pickup due to a tilt.
Figure 4B:
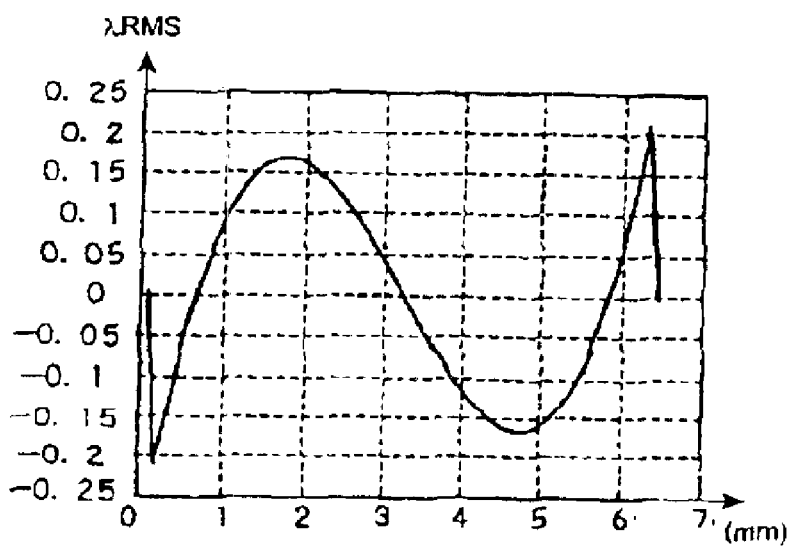

FIG. 4a is a chart, showing the distribution of coma-aberrations due to a tilt. FIG. 4b is a graph, showing the coma-aberrations at the cross-section taken along the line A–A' of the chart of FIG. 4a. When the distribution of the coma-aberrations of FIG. 4a is compared with the divided electrode patterns of FIGS. 3a and 3b, it is noted that the distribution of the coma-aberration of the divided electrode pattern of the comparative embodiment of FIG. 3b approaches the distribution of FIG. 4a.

Figure 5:
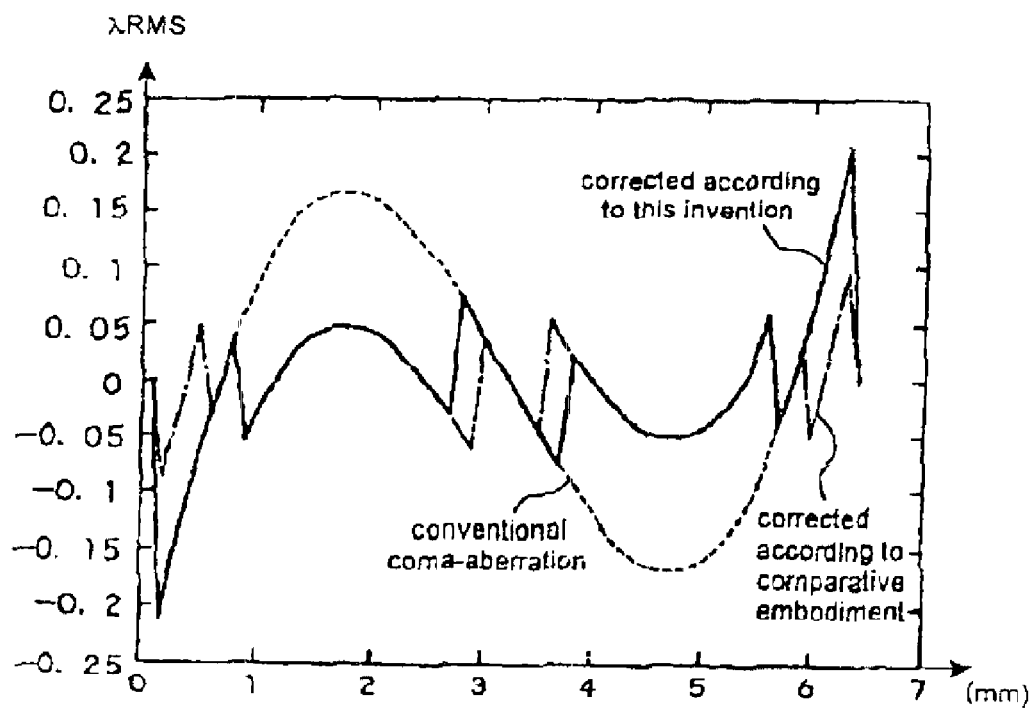
FIG. 5 is a graph, comparatively showing the uncorrected coma-aberrations, the coma-aberrations corrected using a divided electrode pattern according to the primary embodiment of this invention, and the coma-aberrations corrected using a divided electrode pattern of the comparative embodiment.

FIG. 5 is a graph, comparatively showing uncorrected coma-aberrations of FIG. 4b, coma-aberrations corrected using the electrode layer 16 having the divided electrode pattern of FIG. 3a according to the primary embodiment of this invention, and coma-aberrations corrected using the divided electrode layer of the comparative embodiment of FIG. 3b. In the comparative embodiment, it is possible to correct a coma-aberration even at the outer edge of an optical disc. However, in the primary embodiment of the present invention, it is impossible to correct a coma-aberration at the outer edge of an optical disc.

Figure 6:
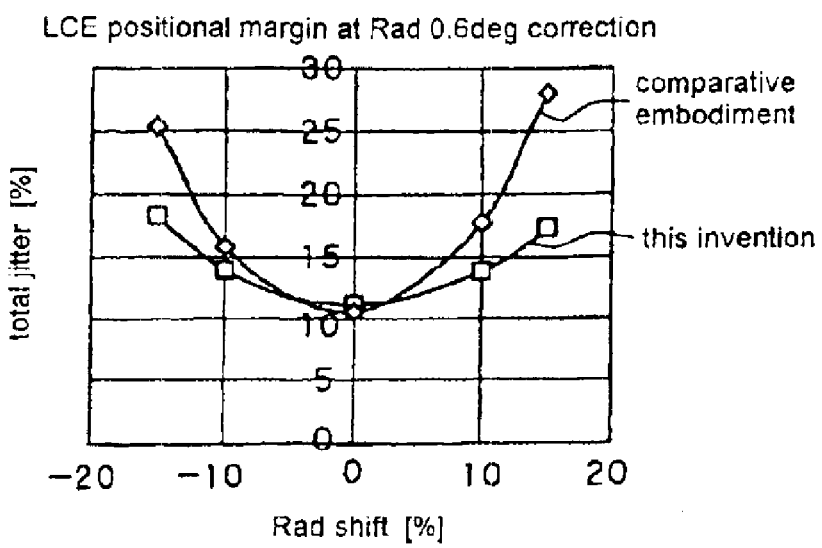
FIG. 6 is a graph, showing the variations of jitter, formed by both the divided electrode pattern according to the primary embodiment of this invention and the divided electrode pattern of the comparative embodiment when the object lens of the optical pickup is shifted in a radial direction of an optical disc.

However, during an operation of an optical pickup using a liquid crystal panel 6, the object lens 7 is shifted in a radial direction of an optical disc 1 due to a tracking servo of the optical pickup for radially moving on the recording surface to read data of the tracks of the disc. The optical axis of the object lens 7 may be thus misaligned from the central axis of the liquid crystal panel 6 in the radial direction of the optical disc 1, and deteriorates the aberration correcting performance of the optical pickup. During an operation of an optical pickup using a liquid crystal panel, a tracking shift of about ±0.1 mm is typically and normally generated. FIG. 6 is a graph, showing the variations of jitter, generated from both the electrode pattern according to the primary embodiment of this invention and the electrode pattern of the comparative embodiment when the object lens 7 is shifted in the radial direction of the optical disc 1. In the graph of FIG. 6, the unit "%" of the radial shift denotes a ratio of the radial shift to a radius of the object lens 7. For example, the radial shift of 10% in the case of 2 mm radius of the object lens is equal to 0.2 mm. As shown in the graph of FIG. 6, the electrode pattern according to the comparative embodiment has a superior performance at its center, but becomes inferior in its performance due to the radial shift. This is caused by the fact that the electrode pattern according to the comparative embodiment corrects a coma-aberration even at the outer edge of an optical disc, and allows the aberration correction at the outer edge of the disc to have an ill-effect on the performance.

Figure 7A:
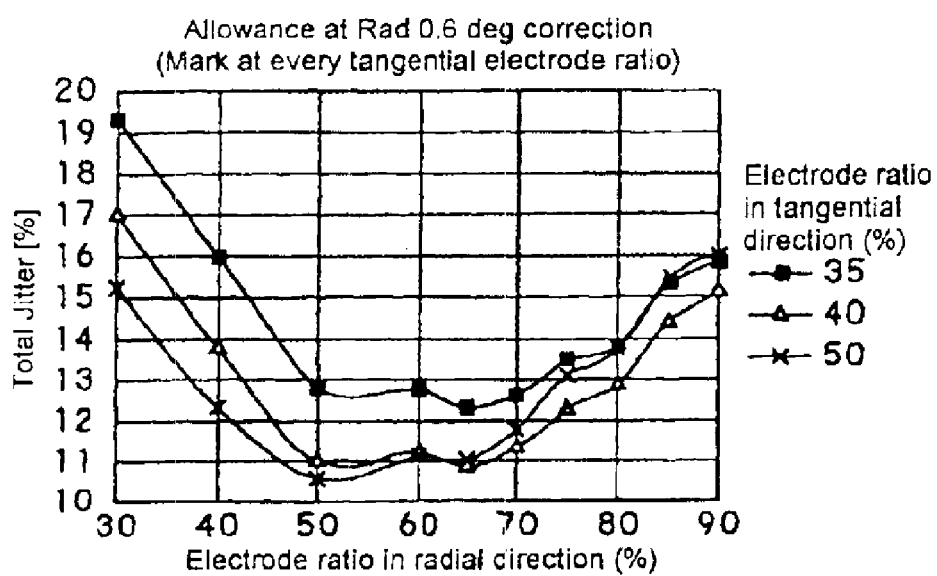
FIGS. 7a and 7b are graphs, showing the variations of jitter, formed by the divided electrode pattern according to the primary embodiment of this invention when the pattern of the independent electrodes included in the electrode layer is changed.
Figure 7B:
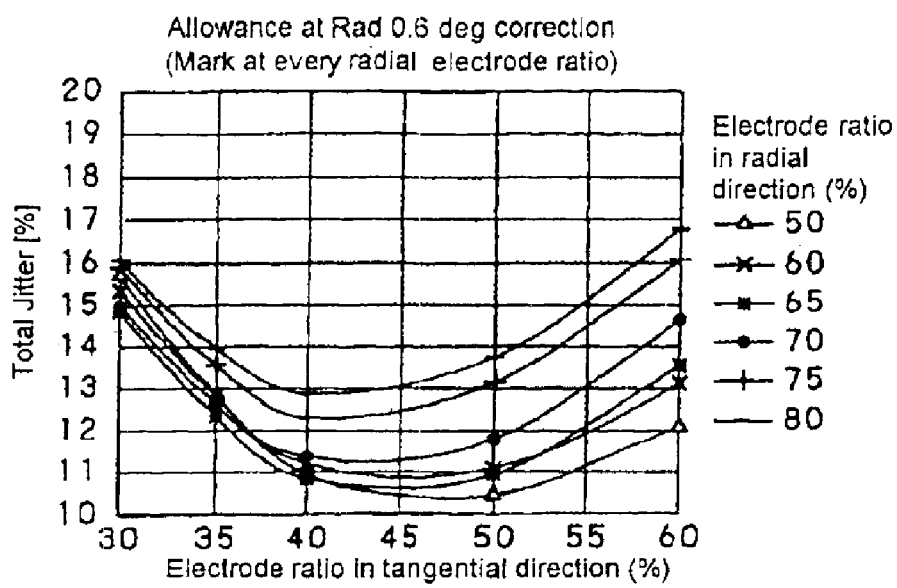

Hereinbelow, the dimension of the divided electrode layer 16 will be described in detail with reference to FIGS. 7a and 7. FIGS. 7a and 7b are graphs, showing the variations of jitter, formed by the divided electrode pattern according to the primary embodiment of this invention when the pattern of the independent electrodes 16a and 16b included in the divided electrode layer 16 is changed. The electrode ratio in a radial direction in the graph of FIG. 7a, and the electrode ratio in a tangential direction in the graph of FIG. 7b each mean a ratio of the electrode length to the aperture diameter of the object lens 7. In particular, the electrode length in the radial direction is a summed length of the two independent electrodes 16a and 16b.

When the electrode ratio in the radial direction ranges from 50% to 70% in the graph of FIG. 7a, the divided electrode layer forms a stable jitter. In addition, when the electrode ratio in the tangential direction ranges from 40% to 50% in the graph of FIG. 7b, the divided electrode layer forms a stable jitter. The jitter values shown in the graphs of FIGS. 7a and 7b were obtained from a land and groove disc, with phase difference of 120°, Naobj=0.65, wavelength= 0.405 [μm], track pitch=0.36 [μm], and EFM signal IT [μm]=0.083 [μm].

Figure 8:
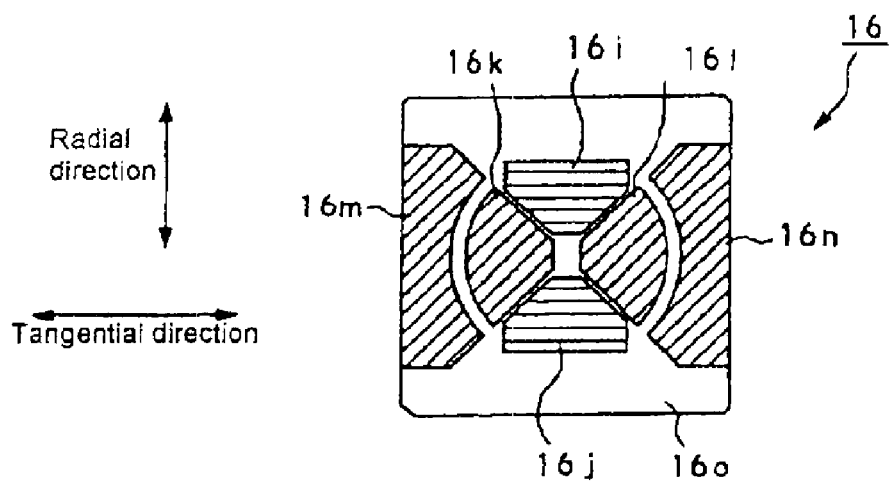
FIG. 8 is a view, showing a divided electrode pattern of an electrode layer of a liquid crystal panel according to the second embodiment of the present invention.

FIG. 8 is a view, showing a divided electrode pattern of an electrode layer 16 of a liquid crystal panel 6 according to the second embodiment of the present invention. As shown in the drawing, the liquid crystal panel 6 according to the second embodiment of this invention is designed to correct an aberration caused by tilts in both a radial direction and a tangential direction. In order to accomplish the above object, the electrode pattern of the liquid crystal panel 6 according to the second embodiment includes the divided electrode pattern according to the primary embodiment of this invention combined with another divided electrode pattern obtained from a rotation of the divided electrode pattern according to the comparative embodiment around its optical axis at an angle of 90°. In the second embodiment of FIG. 8, two independent electrodes 16i and 16j are identified with the two independent electrodes 16a and 16b of the primary embodiment of FIG. 3a, while four independent electrodes 16k, 16l, 16m and 16n are identified with the four independent electrodes 16d, 16e, 16f and 16g of the comparative embodiment of FIG. 3b. The remaining part of the electrode layer according to the second embodiment forms a common electrode 16o.

Since the optical axis of a light beam emitted from an optical pickup is more easily tilted In the tangential direction of an optical disc rather than the radial direction, it is necessary to enhance the aberration correcting performance of the liquid crystal panel in the tangential direction rather than the radial direction. In addition, since the object lens 7 is shifted in the radial direction, it is necessary for the liquid crystal panel to more effectively endure a radial shift. However, as the object lens 7 is not shifted in the tangential direction, it is not necessary consider a tangential shift while designing the liquid crystal panel.

Therefore, the electrode pattern of the electrode layer included in the liquid crystal panel according to the second embodiment of this invention has a superior central performance in the tangential direction, and so the electrode layer of this embodiment has the electrode pattern of the comparative embodiment in said tangential direction. However, in the radial direction, the electrode layer of this second embodiment has the electrode pattern of the primary embodiment capable of effectively correcting an aberration caused by a radial shift of the object lens 7. In a brief description, the electrode layer according to the second embodiment has an asymmetrically divided electrode pattern in the radial direction and tangential direction so as to improve the aberration correcting performance of the liquid crystal panel.

Figure 9:
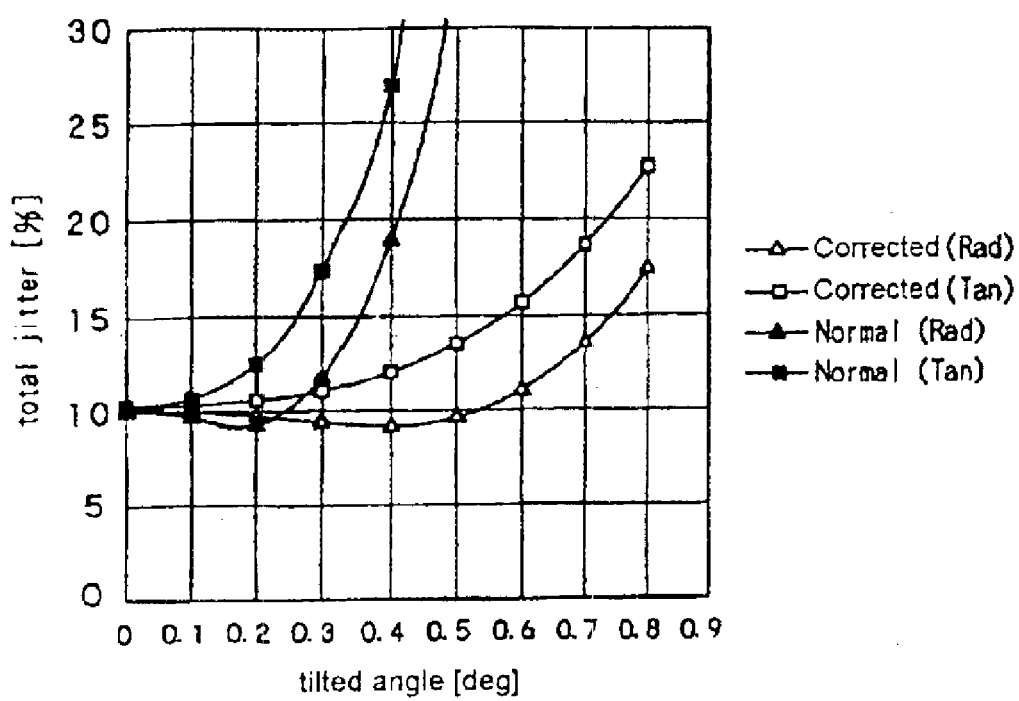
FIG. 9 is a graph, comparatively showing deterioration of jitter due to a tilt when the optical pickup uses the liquid crystal panel according to the second embodiment of the present invention, and does not use the liquid crystal panel.

FIG. 9 is a graph, comparatively showing deterioration of jitter due to a tilt when the optical pickup uses the liquid crystal panel 6 according to the second embodiment of the present invention, and does not use the liquid crystal panel 6. Of course, when the optical pickup does not use the liquid crystal panel 6, the aberration caused by a tilt of an optical axis is not corrected. Since the allowable total jitter is set to about 15%, it is possible to tilt the optical axis to form a tilted angle of about 0.6° in the radial and tangential directions when the optical pickup uses the liquid crystal panel 6 of this second embodiment. However, when he optical pickup does not use the liquid crystal panel 6 of this second embodiment, the allowable tilted angle of the optical axis is set to an angle of about 0.25°.

As described above, the present invention provides an optical pickup, of which the aberration correcting unit is not expensive, but is easily controllable, in addition to effectively correcting an aberration caused by a radial shift of the object lens of the optical pickup.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An optical pickup, comprising: a light emitting unit used for emitting light, an object lens used for collimating the light from the light emitting unit to form a beam of light and focusing the beam of light to a recording surface of an optical disc, and a correction unit used for correcting an aberration caused by a tilt of an optical axis of the beam of light relative to the recording surface of the optical disc, wherein said correction unit has a light transmitting surface capable of allowing a transmission of the light from the light emitting unit, with a plurality of electrodes arranged on a plurality of divided areas of the light transmitting surface, said correction unit correcting the aberration by applying voltages, corresponding to said tilt of the optical axis of the beam of light relative to the recording surface of the optical disc, to said electrodes and changing phases of the bean of light passing through the divided areas of the light transmitting surface, said electrodes consisting of:

a first electrode arranged on at least one area of the light transmitting surface of said correction unit at a position maximizing an aberration, caused by a radial tilt of the optical axis of the beam of light relative to the recording surface of the optical disc in a radial direction of the disc; and a second electrode arranged on at least one area of the light transmitting surface of said correction unit at a position minimizing the aberration, caused by the radial tilt of the optical axis of the beam of light relative to the recording surface of the optical disc, and a summed length of said first and second electrodes in the radial direction of the optical disc ranges from 50% to 70% of a diameter of said object lens, and a length of said first or second electrode in a tangential direction of the optical disc ranges from 40% to 50% of the diameter of said object lens.

2. The optical pickup according to claim 1, wherein said electrodes arranged on the divided areas of the light transmitting surface of said correction unit further comprise:

a third electrode arranged on at least one area of the light transmitting surface of said correction unit at a position maximizing an aberration, caused by a tangential tilt of the optical axis of the beam of light relative to the recording surface of the optical disc in a tangential direction of the disc;

a fourth electrode arranged on at least one area of the light transmitting surface of said correction unit at a position minimizing the aberration, caused by the tangential tilt of the optical axis of the beam of light relative to the recording surface of the optical disc;

a fifth electrode arranged to be aligned with said third and fourth electrodes at a position close to an edge of the light transmitting surface outside the third electrode; and a sixth electrode arranged to be aligned with said third and fourth electrodes at a position close to an edge of the light transmitting surface outside the fourth electrode.

* * * * *